United States Patent [19]

Bryant et al.

[11] 4,336,454

[45] Jun. 22, 1982

[54] SMOKE DETECTOR IONISATION CHAMBER USING NICKEL-63 SOURCE

[75] Inventors: Jack Bryant; Mark Janicki, both of Amersham, England

[73] Assignee: The Radiochemical Centre Limited, Amersham, England

[21] Appl. No.: 70,051

[22] Filed: Aug. 27, 1979

[30] Foreign Application Priority Data

May 18, 1979 [GB] United Kingdom ................. 7917447

[51] Int. Cl.[3] ................................................ G01T 1/18

[52] U.S. Cl. .................................................... 250/381

[58] Field of Search ......................... 250/381; 340/629

[56] References Cited

U.S. PATENT DOCUMENTS

| | | | |
|---|---|---|---|
| 3,676,681 | 7/1972 | Kobayashi | 250/381 |
| 3,909,815 | 9/1975 | Gacogne | 250/381 |
| 4,007,374 | 2/1977 | Solomon | 250/381 |
| 4,017,733 | 4/1977 | Ishll et al. | 250/381 |
| 4,021,671 | 5/1977 | Solomon | 250/381 |
| 4,121,105 | 10/1978 | Solomon | 250/381 |

*Primary Examiner*—Davis L. Willis

*Attorney, Agent, or Firm*—Wenderoth, Lind & Ponack

[57] ABSTRACT

A smoke sensing detector of the dual ionisation region type, including an inner electrode, an outer electrode, and a collector electrode mounted on the inner electrode by means of pillers of insulating material, a first ionisation region being formed by the outer electrode and the collector electrode, and a second or reference ionisation region being formed by the inner electrode and the collector electrode, wherein the collector electrode supports or incorporates a nickel-63 radioactive source emitting radiation into both ionisation regions.

10 Claims, 11 Drawing Figures

SMOKE DETECTOR IONISATION CHAMBER USING NICKEL-63 SOURCE

This invention relates to smoke detector ionisation chambers using a nickel-63 source. Nickel-63 has a half-life of 100 years and emits beta particles of unusually low energy (maximum 66 keV). The maximum range of the beta particles in air under ambient conditions is 4 cm, and 50% of the particles are stopped within a distance of 5 mm. Nickel-63 sources are conventionally made by electroplating on to a suitable substrate, such as a metal foil or wire. The substrate should be chosen to have good resistance to corrosion, and it is conventional to protect the nickel-63 deposit with a very thin coat of precious metal, such as rhodium. Methods other than electroplating may also be employed for making nickel-63 sources.

A smoke detector ionisation chamber using a nickel-63 source is described in British patent specification No. 1,228,800. This is a single chamber, employing two electrodes. The range of source strengths prescribed, 50 to 1600 microcuries, is high by present day standards particularly in relation to International recommendations on maximum allowable activity in devices of this kind. Thus the OECD advises an upper limit of 500 microcuries of nickel-63 for an industrial device, which implies an upper limit of 25 microcuries for a domestic device ("Recommendations for Ionisation Chamber Smoke Detectors in implementation of Radiation Protection Standards", NEA Group of OECD, 1977).

U.S. Pat. Nos. 4,021,671 and 4,121,105 describe a device consisting of a pair of ionisation chambers, each having two electrodes, and each preferably provided with a radioactive source of a beta-emitter such as nickel-63. A means of providing a source of beta-emitter such as nickel-63 for such two electrode chambers is described in U.S. Pat. No. 4,007,374, where the nickel-63 source is in the form of a spiral of wire or metallic ribbon.

It is nowadays common to employ a smoke detector ionisation chamber in which the two separate chambers of the device mentioned above are arranged so that a single radioactive source irradiates both chambers or to employ a single chamber, divided into two ionisation regions by a third electrode, with a single radioactive source irradiating both regions. The present invention concerns the employment of a single nickel-63 source (or a single assembly of nickel-63 sources) in a smoke detector ionisation chamber in which a third electrode divides the chamber into two ionisation regions.

Smoke detector ionisation chambers of the kind envisaged include an outer electrode, a collector electrode and an inner electrode. The outer electrode and the collector electrode define between them an outer ionisation region adapted to allow smoke to enter from the surrounding atmosphere, and the collector electrode and the inner electrode define between them an inner ionisation region, which may, but need not, be open to the ingress of smoke. A single radioactive source (or a single assembly of radioactive sources) produces ionisation simultaneously in both ionisation regions. When a potential difference is maintained across the inner and outer electrodes, the collector electrode assumes an intermediate potential determined by the ratio of ionisation responses caused by the radioactive source or sources in the two regions which responses are principally dependent on the spatial layout of the electrodes and the position and nature of the radioactive source or sources. When smoke enters the outer region this ratio, and the potential of the collector electrode, alters, and this alteration of potential is readily and reliably detected by a field effect transistor and used e.g. to trigger an alarm.

One such device is described in our U.S. patent application Ser. No. 959,773, filed Nov. 13, 1978. In this, a single radioactive source is mounted on the inner electrode, and a hole in the collector electrode permits radiation to effect ionisation in both inner and outer ionisation regions of the chamber. This arrangement works well when an alpha-emitter, such as americium-241, is used as the radioactive source, but is less satisfactory when the low energy beta-emitter nickel-63 is used. This is because it is not easily possible to obtain a satisfactory ratio of ionisation in the inner and outer ionisation regions, unless either the hole in the collector electrode is made large and/or the space between the inner electrode and the collector electrode is made very small. A large hole in the collector electrode brings the disadvantage of poor electrical field characteristics because of discontinuities, while a small distance between the inner and collector electrodes requires high standards of manufacture and adds to the danger of electrical leakage between the electrode due to entry of dust and fibres.

Commercially available three-electrode smoke detector ionisation chambers use radiation sources which are alpha-emitters. It has long been recognised as desirable to use beta-emitters for this purpose in place of alpha-emitters, because of the very much lower radiological toxicity of beta-emitters.

Most beta-emitters have physical and chemical properties which render them difficult to employ in smoke detectors; while nickel-63, which does have suitable physical and chemical properties, has radiation of such low energy and short range as to introduce difficulties of design of the smoke detector. The present invention fulfils this need and overcomes this difficulty by providing a particular design of ionisation chamber in which a nickel-63 radiation source is mounted on the collector electrode.

The present invention provides a smoke sensing detector for use with an indicating device, said smoke detector comprising:

a chamber, adapted to allow smoke to pass through;

the base of said chamber forming a first electrode or inner electrode insulated from the remainder of the chamber, said remainder of chamber forming a second electrode or outer electrode;

said chamber having therein a third electrode or collector electrode, mounted on the inner electrode by means of one or more pillars of an insulating material, and serving to divide said chamber into two regions having different electrical characteristics when an appropriate potential difference is maintained across said inner and outer electrodes;

a first ionisation region being formed by said outer electrode and said collector electrode and so constructed that the current which passes is significantly affected by ingress of smoke;

and a second or reference ionisation region being formed by said inner electrode and said collector electrode, so constructed that an essentially constant current passes and which current is little affected by ingress of smoke;

said collector electrode supporting or incorporating a nickel-63 radioactive source emitting radiation into both ionisation regions.

A design in which the collector electrode is mounted on the inner electrode by means of pillars of insulating material has the following advantages:

(a) The simple form of the insulating pillars permits low cost manufacture and the use of desirable, but relatively expensive, insulating materials such as PTFE.

(b) The ratio of surface area to length of these insulators can be favourable (the smaller the surface area, the less chance of leakage of electric current over the surface).

(c) If there is leakage along the insulators, the equipment will "fail safe" in that leakage will be to the inner electrode, and this will have, overall, the same effect as smoke.

(d) It is easy to mount the collector electrode precisely and rigidly in relation to the inner electrode, so as to obtain a correct and constant relationship between the ionising radiation distribution in the two ionisation regions, this is particularly true when the collector electrode is mounted on two or three or more pillars of insulating material.

(e) The design as a whole is well adapted to low cost manufacturing techniques.

In connection with (a), (b), and (c) above it should be noted that insulator failure is a common cause of failure in smoke detector ionisation chambers and the failure in some designs may not be in a "fail safe" mode.

The nickel-63 source may have various configurations. It may be a wire, uniformly coated with nickel-63, or a piece of metal foil coated with nickel-63 on both sides (with the same activity per unit area on each side or with differing activities per unit area on each side). Alternatively, two sources emitting from one side only may be mounted back to back. In the case of a uniformly coated wire or of a piece of foil with the same activity per unit area on each side, the ratio of emissions into the upper and lower ionisation regions can be varied by the use of windows above and/or below the source.

There is a particular advantage in using a plated wire source, in that it can be assumed to be emitting radiation uniformly in all directions, and hence only the electrode geometry and apertures need to be defined. If two back-to-back sources are employed, or if a source prepared by plating on two sides of a large foil (followed by cutting up) is employed, matching of the radioactive emissions may be necessary.

It is possible, but not necessary, to provide a hole in the collector electrode. If the radioactive source is in the form of a wire, then it may be convenient to provide a hole which defines the length of wire exposed to one or both chambers, but whose other dimensions are greater than the diameter of the wire. If a wide foil or metal disc is being used as a radioactive source, it may be convenient to give it all-round support, thus leaving no hole in the collector electrode.

Distinct advantages in production may be achieved by mounting a length of wire or narrow foil between two metal plates constituting the collector electrode, each plate having a window of a size and shape to determine the amount of radiation reaching the inner or outer ionisation region. If the radioactive source is larger than the windows, then the positioning of the source between the plates can vary within quite wide limits without greatly affecting the ratio of radioactive emission into the two ionisation regions. By contrast, a radioactive source mounted perpendicular to the collector electrode and extending on either side of it must be positioned within narrow tolerances if performance is to be reproducible from one device to the next.

Figure 1:
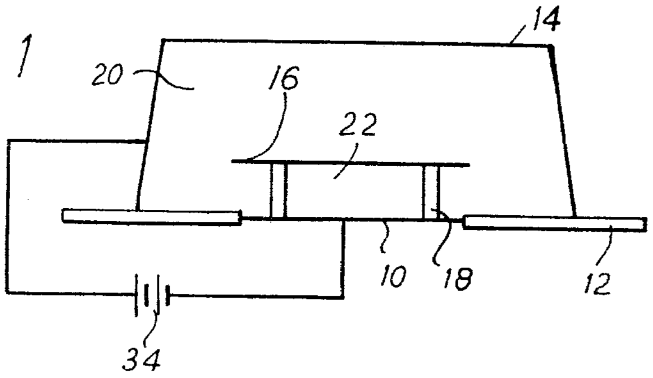
FIG. 1 is a schematic sectional side elevation of a smoke detector device according to this invention.
Figure 2:
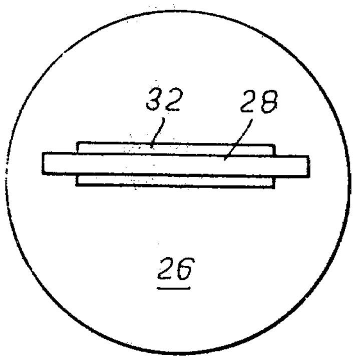
FIGS. 2 and 3 are plan views of the lower and upper plates respectively, which together constitute the collector electrode.

The device shown comprises an inner electrode 10 mounted in an insulating support 12, and an outer electrode 14, which allows smoke to pass freely therethrough, mounted on the same support. A collector electrode shown generally at 16 is mounted through three PTFE pillars 18 on the inner electrode 10, and serves to divide the chamber into two regions having different electrical characteristics when an appropriate potential difference is maintained across the inner and outer electrodes 10 and 14. A first ionisation region 20 is formed between the outer electrode 14 and the collector electrode 16 and is so constructed that the current which passes is significantly affected by ingress of smoke. A second or reference ionisation region 22 is formed between the inner electrode 10 and the collector electrode 16 and so constructed that an essentially constant current passes and which current is little affected by ingress of smoke.

The collector electrode 16 consists of upper and lower aperture plates 24 and 26 respectively, spot welded together so as to sandwich a length of wire 28, plated uniformly with nickel-63, between them. The upper aperture plate 24 has a central circular hole 30, 13 mm. in diameter, with the wire 28 positioned diametrically across it. The lower aperture plate 26 has a 2×16 mm. slot 32, with the wire 28 extending lengthwise along the middle of the slot. The wire 28 is 18 mm. in length, 0.7 mm. in diameter and is uniformly plated with a total 25 microCuries of nickel-63.

In use, a power supply 34 applies a potential difference of 9 volts between the inner and outer electrodes 10 and 14. The collector electrode 16 is connected to a field effect transistor (not shown), which may be used to trigger an alarm.

Figure 4:
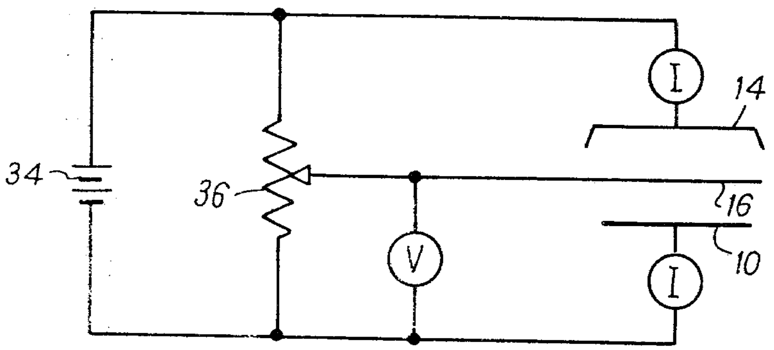
FIG. 4 is a circuit diagram of a test circuit for testing performance of the device of FIGS. 1–3.

FIG. 4 shows a test circuit, used to test performance of the device, in which the potential of the collector electrode 16 can be altered at will by means of the variable resistance 36.

Figure 5:
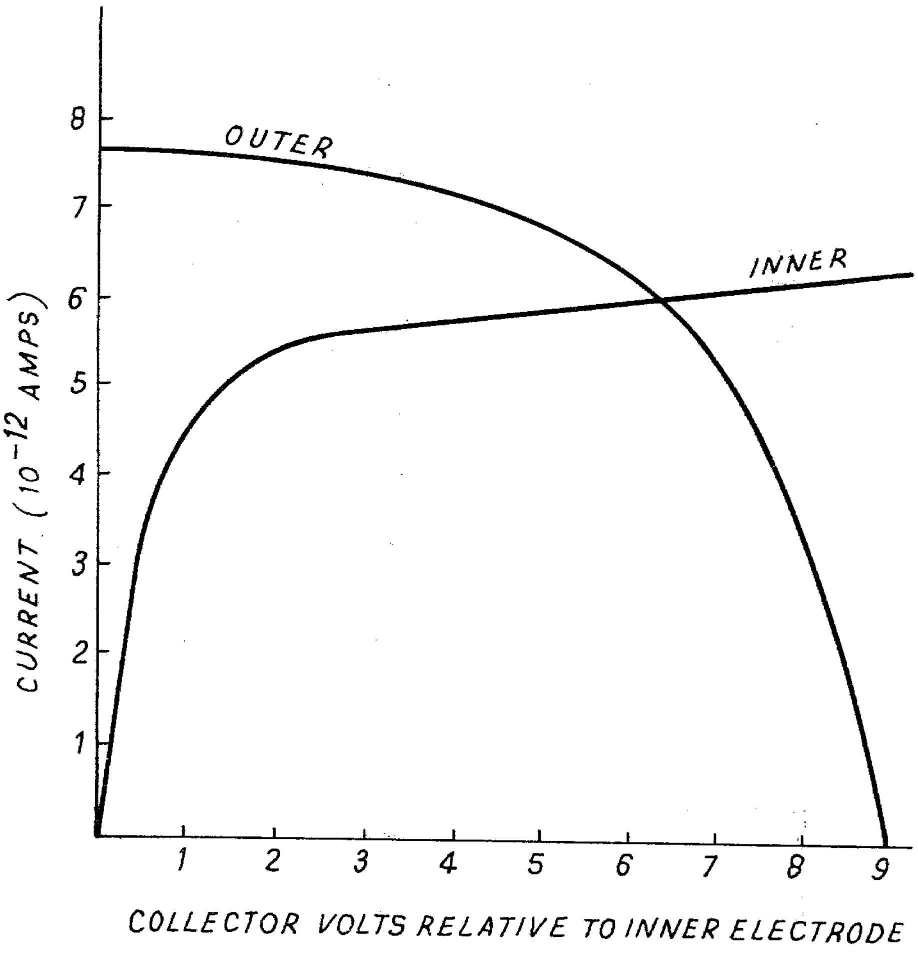
FIGS. 5 and 6 are graphs showing the results of such a test.

FIG. 5 shows the results of such a test, in the form of a graph of ion current passing through the inner and outer ionisation regions, 22 and 20 respectively, against the potential of the collector electrode 16 relative to the inner electrode 10. The inner ionisation region 22 shows a current which, after an initial steep rise, rises only slowly with increasing voltage on the collector electrode, whereas, at the balance point of about 6.25 volts, the current in the outer ionisation region 20 is falling rapidly with increasing collector electrode voltage. This is indicative of the desired characteristics of an inner ionisation region little affected by entry of smoke and an outer ionisation region strongly affected by entry of smoke.

Figure 3:
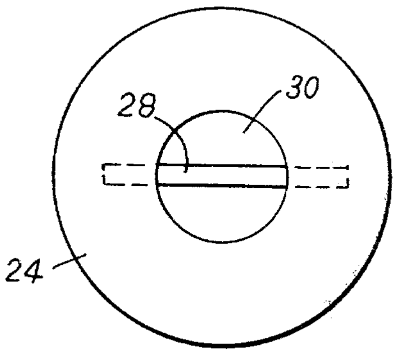
Figure 6:
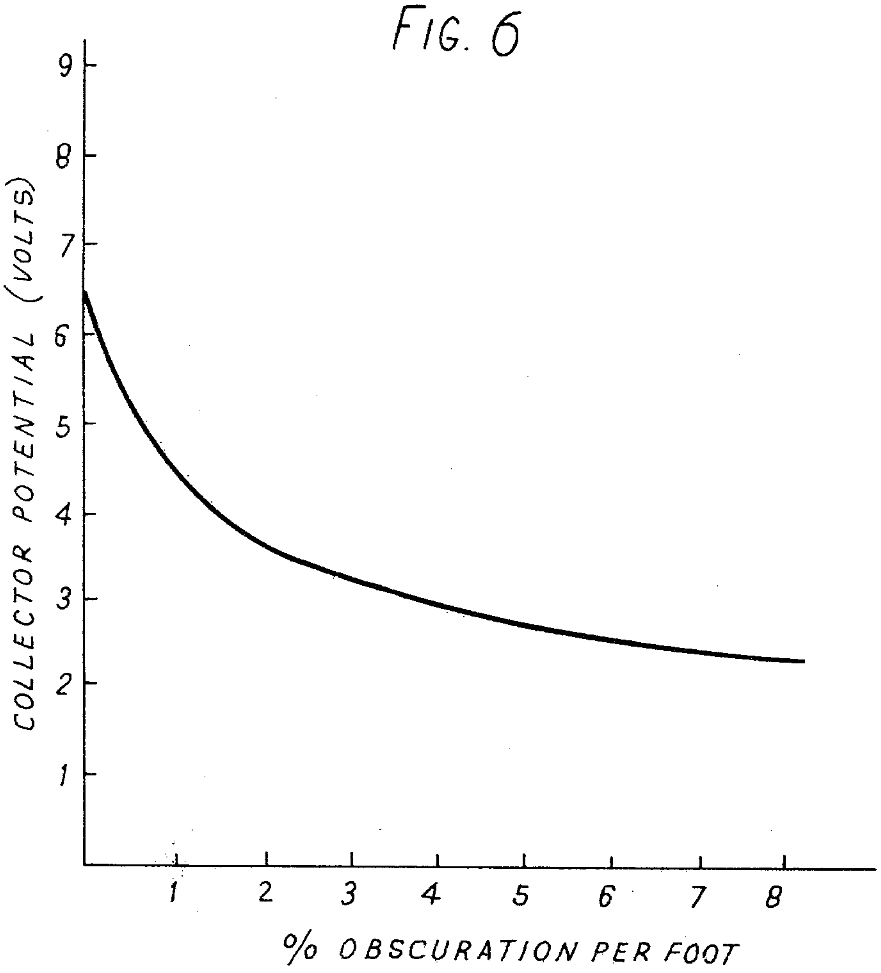

The device was tested as described in British Standard BS5446: Part 1: 1977, using a wind tunnel as shown in FIG. 3 of that Specification. The result of that test is shown in FIG. 6, which is a graph of collector potential (in volts) against percent obscuration per foot caused by smoke from a Whatman No. 2 filter paper heated on an electric element.

The measured characteristics of the device according to the present invention are set out below. The characteristics of an ionisation chamber with a 0.5 microCurie americium-241 source mounted on the inner electrode as described in our co-pending U.S. patent application Ser. No. 959,773 are included for comparison.

| | Nickel-63 | Americium-241 |
|---|---|---|
| Balance voltage | 6.25 volts | 5.5 volts |
| Ion current | $6 \times 10^{-12}$ amps | $1.2 \times 10^{-11}$ amps |
| Voltage shift for 1% obscuration/ft | 1.8 volts | 1.8 volts |

The radioactive source does not have to be fixed to the collector electrode as shown, but may be fixed by resistance welding, or by pressing into pre-formed slots or by pressing on pre-formed tags.

FIGS. 7 to 11 are axial sections of the collector electrode showing alternative arrangements for mounting the nickel-63 radioactive source.

Figure 7:
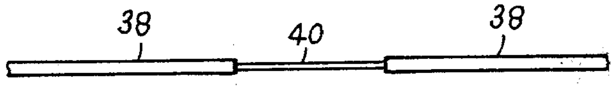
FIGS. 7–11 are axial sectional views of modified embodiments of the collector electrode according to the present invention.

In FIG. 7, a collector electrode 38 has a central hole across which a radioactive source 40 is mounted in the plane of the electrode. The shape of the central hole is immaterial and may be for example circular or rectangular. The radioactive source 40 may be a wire or a narrow piece of foil coated on both surfaces with nickel-63.

Figure 8:
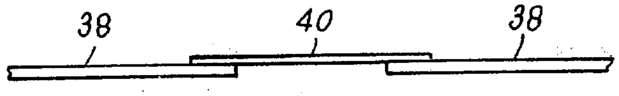

FIG. 8 is as FIG. 7, except that the radioactive source 40 is mounted parallel to but above the plane of the collector electrode 38.

Figure 9:
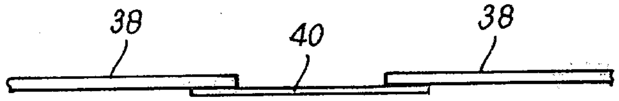

FIG. 9 is as FIG. 7, except that the radioactive source 40 is mounted parallel to but below the plane of the collector electrode 38.

Figure 10:
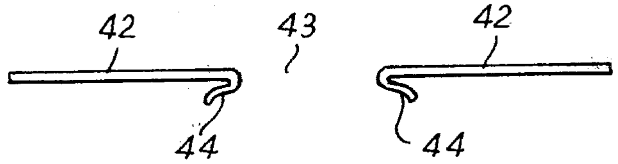
Figure 11:
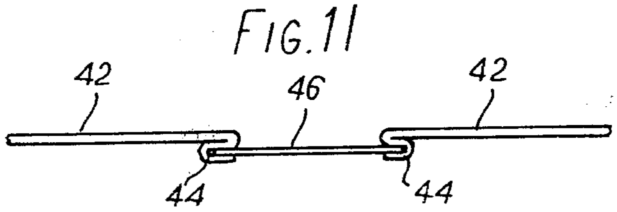

Referring to FIGS. 10 and 11, a collector electrode 42 has a generally circular central hole 43 around which the metal of the electrode is stepped at 44. A circular disc of metal foil 46, of appropriate size to fill the hole 43, the disc being coated on both sides with nickel-63, is dropped into the recess formed by the step 44 and the metal pressed or spun over so as to hold the disc in position.

We claim:

1. A smoke sensing detector for use with an indicating device, said smoke detector comprising:

a chamber defining means defining a chamber adapted for allowing smoke to pass therethrough;

said chamber having a base which is an inner electrode and insulated from the remainder of the chamber, said remainder of chamber being an outer electrode;

said chamber having therein a collector electrode, at least one pillar of an insulating material on said inner electrode on which said collector electrode is mounted, said collector electrode being positioned for dividing said chamber into two regions having different electrical characteristics when an appropriate potential difference is maintained across said inner and outer electrodes, said two regions being an outer ionisation region defined by said outer electrode and said collector electrode for having a current which passes therethrough significantly affected by ingress of smoke into said chamber, and a reference ionisation region defined by said inner electrode and said collector electrode, for having an essentially constant current passing therethrough which is substantially unaffected by ingress of smoke into said chamber;

said collector electrode having structurally associated therewith a nickel-63 radioactive source emitting radiation into both ionisation regions.

2. A smoke sensing detector according to claim 1 wherein the nickel-63 source is a wire uniformly coated with nickel-63.

3. A smoke sensing detector according to claim 1, wherein the nickel-63 source is a piece of metal foil coated with nickel-63 on both sides.

4. A smoke-sensing detector according to claim 1, wherein the collector electrode is essentially planar and the nickel-63 source extends parallel to the plane of the said electrode.

5. A smoke sensing detector according to claim 4, wherein said collector electrode is comprised of two metal plates one on top of the other and the nickel-63 source comprises a length of wire or of a narrow strip of foil uniformly coated with nickel-63 and mounted between said two metal plates.

6. A smoke sensing detector according to claim 5, wherein each of the said plates has a window therein of a size and shape for determining the amount of radiation reaching the reference and the outer ionisation region.

7. A smoke sensing detector according to claim 4, wherein the collector electrode has a central hole across which the radioactive source is mounted.

8. A smoke sensing detector according to claim 7, wherein the radioactive source is a wire uniformly coated with nickel-63.

9. A smoke sensing detector according to claim 7, wherein the radioactive source is a narrow strip of metal foil coated with nickel-63 on both sides.

10. A smoke sensing detector according to claim 7, wherein the radioactive source is a piece of metal foil, of a size and shape to completely fill the said central hole, and coated with nickel-63 on both sides.

* * * * *